United States Patent [19]

Lee et al.

[11] Patent Number: 4,492,970

[45] Date of Patent: Jan. 8, 1985

[54] LASER DIODE PRINTER

[75] Inventors: Charles C. Lee, Little Canada; Richard Owen, St. Anthony, both of Minn.

[73] Assignee: Minnesota Mining & Manufacturing Company, St. Paul, Minn.

[21] Appl. No.: 400,638

[22] Filed: Jul. 22, 1982

[51] Int. Cl.³ ............................................. G01D 15/14
[52] U.S. Cl. .................................... 346/160; 346/108; 350/6.8; 358/293
[58] Field of Search ................ 346/160, 108; 358/285, 358/293; 350/6.1, 6.7, 6.8, 6.91; 355/8

[56] References Cited

U.S. PATENT DOCUMENTS

| 3,624,574 | 11/1971 | Montagu et al. | 350/6.91 X |
|---|---|---|---|
| 4,135,119 | 1/1979 | Brosens | 350/6.1 X |
| 4,212,530 | 7/1980 | Pitts, Jr. | 346/160 X |
| 4,257,701 | 3/1981 | Hirayama et al. | 355/8 |
| 4,383,755 | 5/1983 | Fedder et al. | 346/160 X |
| 4,404,570 | 9/1983 | Ohnishi et al. | 346/108 |

FOREIGN PATENT DOCUMENTS 0056547  5/1977  Japan ..................................... 350/6.8

OTHER PUBLICATIONS

Matsuda et al., Laser Printer Scanning System with a Parabolic Mirror, Applied Optics, Mar. 15, 1978, pp. 878-884.

*Primary Examiner*—Thomas H. Tarcza
*Attorney, Agent, or Firm*—Donald M. Sell; James A. Smith; John C. Barnes

[57] ABSTRACT

The printer disclosed converts electronic information into human readable information by an imaging device comprising a laser diode which is a source of coherent monochromatic radiation requiring very low power to expose a sensitized sheet. The radiation from the laser diode may scan a focal plane on which the radiation is focused by an objective lens and compounded curved mirror such as a parabolic mirror. The medium for the image is a zinc oxide sensitized sheet.

12 Claims, 3 Drawing Figures

LASER DIODE PRINTER

DESCRIPTION

1. Technical Field

This invention relates to a printer for electronic generated graphic information and in one aspect to a very low power, electrophotographic, nonimpact and low-noise printer.

2. Background Art

The computer's ability to process various kinds of data at great speeds demands the conversion, storage and comparison of information in electrical formats. Similarly it must be again converted to human-readable formats and thus there is a growing demand for on-line printers to accept the electrical signals and a convert them to a readable format at very high printing speeds onto hard copy for the user. The laser has provided a source of radiation with a small spot size which is modulatable very rapidly to produce a latent image pattern on a photoconductive surface of a drum or belt to achieve rapid printout of computer generated information. Such systems utilizing the laser and a scanning system for line generation from a stationary laser are described. The size and cost of laser scanning systems to utilize a He-Ne laser, acousto-optic modulator, collimating lenses, a rotating or oscillating scanner, a parabolic mirror or a flat field fθ lens, a rotating drum to accept the modulated radiation and the associated image developing and transfer stations results in a relatively large expensive piece of hardware which expense exceeds that of the impact printers such that they are not acceptable.

The present invention on the otherhand provides an economical laser printer of good resolution. The machine is compact and provides a nonimpact noiseless printer.

The present invention utilizes a laser diode for the source of the imaging radiation in the near infrared range, a combination of an objective lens and curved mirror for focusing the radiation and a scanning means for moving the beam of radiation. The printer does not need expensive flat field lenses to focus the beam onto the surface of the photoconductor. The radiation is directed onto a photoconductor and preferrably a paper sensitized with a zinc-oxide (ZnO) photoconductor upon which the image may be directly developed and fixed.

DISCLOSURE OF INVENTION

The printer of the present invention comprises a source of monochromatic radiation of very low power, means for focusing the radiation to a spot, and means for scanning a linear focal plane with said spot of radiation. The focal plane is defined by support apparatus for the print paper. The printer thus further comprises a support for a supply of paper having a near infrared radiation-sensitive coating, drive means for advancing paper from the supply, means for supporting the paper at the focal plane of the radiation, means for developing the latent electrophotographic image on the paper and means for fixing the image to the paper.

The preferred source of radiation is a laser diode affording coherent monochromatic radiation with three to fifteen milliwatts of power. The radiation is focused to a spot on a flat field by an objective lens positioned adjacent and in the path of the radiation from the laser diode and a parabolic mirror. A scanning mirror disposed in the path of the radiation directs the radiation along a transverse linear path. An interface with the laser diode adaptable to couple the printer to a particular electronic data format drives the laser to transfer the electronic signals to human readable graphic symbols on the paper.

BRIEF DESCRIPTION OF DRAWINGS

The present invention will be described in greater detail hereafter with reference to the accompanying drawing wherein.

BEST MODE FOR CARRYING OUT THE INVENTION

The present invention provides a new imaging device for nonimpact printers for producing human readable or hard copy prints of electronic information or data processed, stored and/or compared electronically. The imaging device utilizes a low power monochromatic light source which light is focused and scanned across a linear focal plane to produce a latent image on a paper sensitized to the light radiated from the source. This latent image can then be developed on-line to deliver the operator acceptable copy of the data direct from the source.

Figure 1:
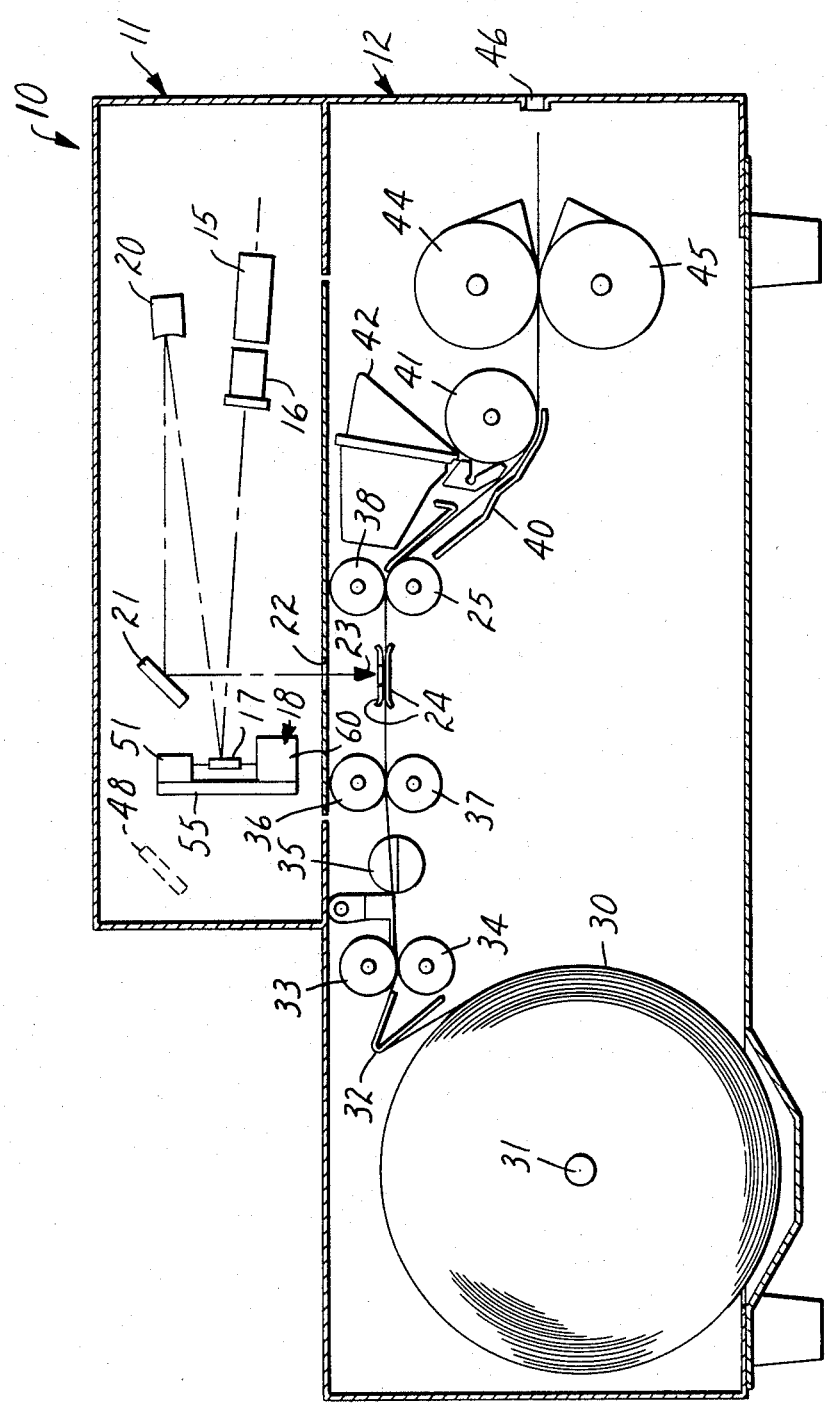
FIG. 1 is a diagrammatic vertical sectional view of a printer constructed according to the present invention.

A printer according to the present invention is illustrated in FIG. 1 and is generally designated 10. The printer comprises an imaging device 11 and the copy exposing and developing device 12.

The imaging device comprises a laser diode 15 positioned to project radiation therefrom through an objective lens 16 toward a scanning means for moving the beam transversely such as a mirror 17 positioned on a galvanometer 18 is oscillated. The mirror is mounted on the galvanometer. Alternatively, a polygon mirror may be used. The galvanometer and mirror provide means for moving the beam of radiation from the lens 16 across a concave, compound curved mirror 20. The mirror 20 reflects the radiation to a mirror 21 disposed to reflect the radiation through a slit 22 onto a linear focal plane 23 defined by a pair of support members 24 in the copy device 12.

The laser diode 15 may be a laser diode from 3 to 15 milliwatts and an example of such a laser diode is one available from Mitsubishi Electric Corporation of Tokyo, Japan, identified as ML3001 which is rated as 3 milliwatts and 830 nanometers with an emitting area of 0.5 by 2.0 microns. Alternatively the laser diode may be from General Optronics Inc. of S. Plainfield, N.J., Model GOL5, which is rated at 5 milliwatts or from Hitachi, Ltd. of Tokyo, Japan, Type HLP-1400 having a power of 15 milliwatts. The laser diode is preferably disposed at an angle of about 4.5 degrees with respect to the plane of the printer. Light from the laser diode is directed through a high resolution objective lens 16, of 10× to 40×, preferably 20× or an 8mm lens, toward the reflective face of a circular mirror 17. The mirror 17 is mounted on a 1000 cycle per second galvanometer and the mirror and galvanometer rotor are positioned between top and bottom supports for the torsion bar of the galvanometer. The galvanometer 18 is nonlinear but may be of the linear type. The galvanometer is self-resonant with a front surface mirror and an example is the 2S23010 self resonant optical scanner manufactured by General Scanning Inc. of Watertown, Mass.

The curved mirror 20 is preferably a parabolic mirror having a focal length of 17.3 inches and serves, together with the objective lens 16, to focus the radiation from the laser diode 15 onto an ovate spot having a major diameter of between 25 to 250 microns. The total light path is 26.6 inches in length.

The laser diode 15 and the galvanometer 18 are interfaced with a suitable information input device such as a computer to convert electronic information to modulated radiation from the laser diode 15 to impart radiation selectively to the linear focal plane 23 to develop a latent image within the sensitized coating on a paper 30 supported in the copy exposing and developing device 12. The device 12 comprises means 31 for supporting a supply roll of the paper 30 which roll comprises a continuous web of photosensitive paper, which sensitive coating comprises a zinc oxide coating which is sensitized to the radiation from the laser diode. The construction of the paper, is described in copending U.S. patent application Ser. No. 386,334, filed June 8, 1982, in the name Herbert et al and assigned to the assignee of the present invention. Such a description of the sensitized copy paper is incorporated herein by reference.

In the device 12 the paper 30 is drawn from the roll and directed across a guide member 32 and through a first pair of feed rollers 33 and 34. The paper is then directed through a cut-off device 35 and then through charging rollers 36 and 37. The paper is next directed over the support members 24 and drive roller 25. The exposed paper is then directed through a guide chute 40 by the roller 25 and a second feed roller 38. As the paper passes down through the chute 40 and is directed past a developer roll 41, toner powder from a supply cartridge 42 is directed onto the selectively charged areas on the sensitized coating. Then the paper is moved past pressure fusing rollers 44 and 45 to fuse the image to the paper and the copy is directed out of the device through a discharge slot 46.

Figure 3:
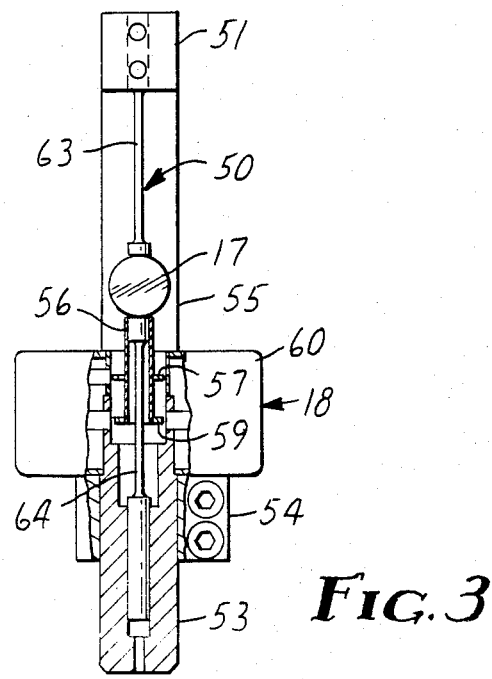
FIG. 3 is a vertical sectional view of the scanning device.

The scanner for the printer is shown in greater detail in FIG. 3. The scanner comprises a rod 50 supported at each end in the mounting frame comprising a top bar 51 securing one end, and a support member 53 affixed in a bracket 54 which is fixed by a bar 55 to the top bar 51. The rod 50 has fixed thereto intermediate the ends, the mirror 17 and a sleeve 56. The sleeve has axially spaced rotors 57 and 59 fixed thereon. The sleeve 56 positions the rotors within the stator pole pieces in the stator 60 which is fixed to the support 53.

The rod 50 has two areas 63 and 64 of reduced cross section to obtain the desired resonating characteristics for the mirror. The top and bottom mounting for the rod 50 restricts the cross axis wobble of the mirror 17. The rod 50 is made of steel to provide the torsion effect in the reduced areas.

Figure 2:
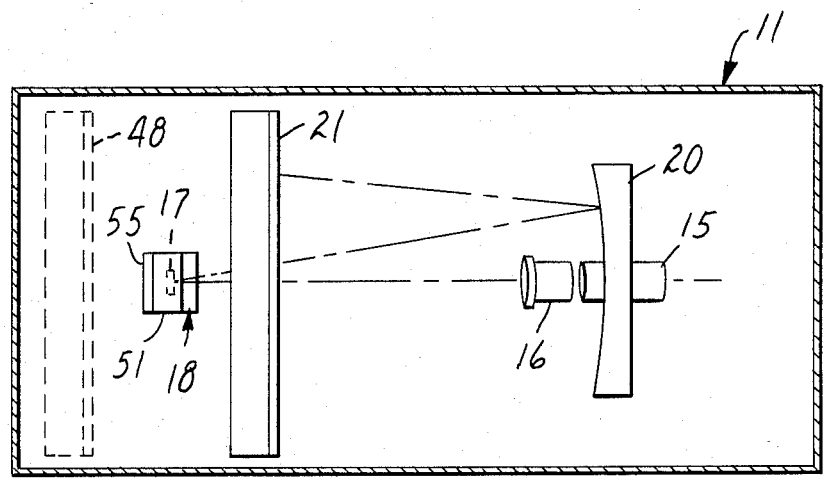
FIG. 2 is a diagrammatic plan view of the imaging device of the printer of FIG. 1.

Alternative arrangements may be provided for the mirror 21 in that, as an imaging device, it may be preferable to have a longer path for the radiation to change the spot size, and the mirror 21 could be disposed further from the curved mirror 20 as illustrated in the dotted line positions of FIG. 1 and 2 for the mirror 48.

Other modifications may be made without departing from the spirit or scope of this invention as defined in the appended claims.

We claim:

1. An imaging device for use with an electrophotographic printer to print graphic information on a web of customary width comprising
    a laser diode source for producing monochromatic radiation,
    condensing lens for collecting radiation from said source and forming a beam,
    a compound curved reflector positioned along said path for imaging radiation from the laser diode onto a flat field, and
    scanning means for moving the beam across a path traverse to said beam.

2. An imaging device according to claim 1 wherein said compound curved reflector is a rectangular sector of a parabolic surface positioned for receiving the beam from the scanning means.

3. An imaging device according to claim 1 wherein the scanning means comprises a mirror driven by a galvanometer.

4. An imaging device according to claim 3 wherein the mirror is mounted on the galvanometer for oscillation about an axis parallel to the reflective surface of the mirror.

5. An imaging device according to claim 4 wherein the mirror of the scanning means is positioned between the condensing lens and the reflector for directing the beam from the condensing lens across the reflector.

6. An imaging device according to claim 5 wherein said compound curved reflector is a rectangular sector of a parabolic surface.

7. A printer for the on-line printing of electronic data comprising an imaging device and a copy exposing and developing device, said imaging device comprising
    a laser diode source for producing monochnomatic radiation,
    means for focusing radiation from said source to a spot on a flat plane,
    scanning means for moving the focused radiation across the flat plane,
    means for advancing a length of paper having a photoconductive coating sensitive to said radiation across said flat plane,
    means for developing a latent image imparted to said photoconductive coating, and
    means for fixing the image to said paper.

8. A printer according to claim 6 wherein said means for focusing radiation from said laser diode source comprises a condensing lens and a parabolic reflector.

9. A printer according to claim 8 wherein said scanning means is positioned between said condensing lens and said parabolic reflector for moving the radiation from said condensing lens across the length of said reflector.

10. An imaging device for use in a nonimpact electrophotographic printer comprising
    a laser diode for emitting radiation in the near infrared range,
    a condensing objective lens for collecting said radiation and forming a beam,
    a mirror mounted in the path of a said beam and movable relative to said beam to move the beam transversely,
    a rectangular concave compound curved reflector positioned to receive said movable beam and to focus said beam to a spot with the moving spot being focused on a flat field in all positions throughout its movement.

11. An imaging device according to claim 10 wherein said laser diode is a 3 to 15 milliwatt diode, said objective lens is a high resolution 8 millimeter lens, and said curved reflector comprises a rectangular sector of a parabolic reflector having a focal length of about 17 inches.

12. A printer according to claim 7 wherein said scanning means comprises a self resonant optical scanner having a mirror mounted on a torsion rod which rod is fixed at each end.

* * * * *